G. E. HASTY.
CAR TRUCK, TRACK, AND STEERING MECHANISM.
APPLICATION FILED AUG. 16, 1917.
1,266,591.
Patented May 21, 1918.
2 SHEETS—SHEET 1.
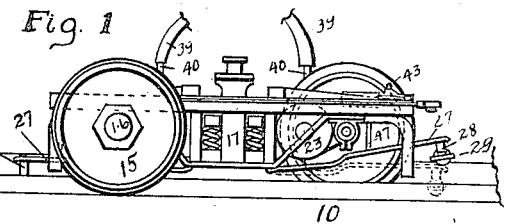
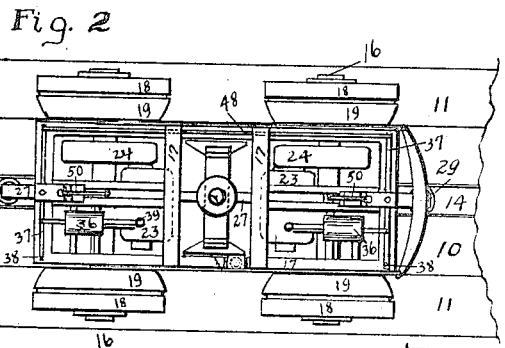
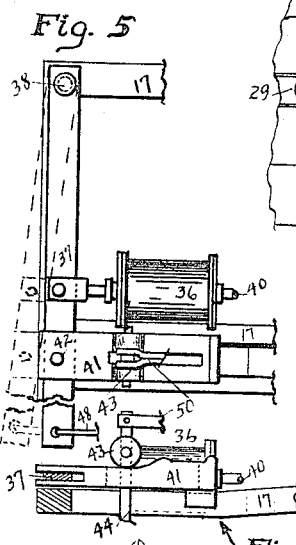
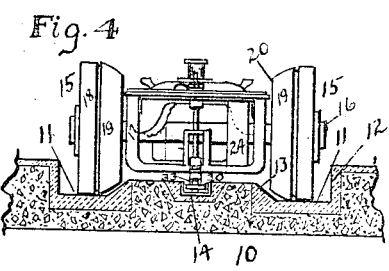
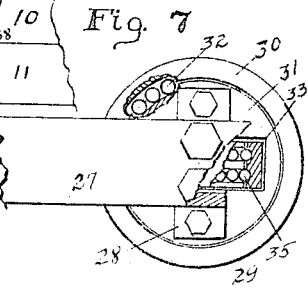
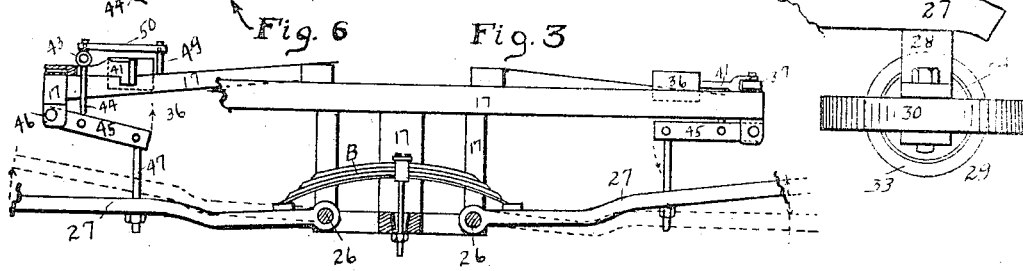
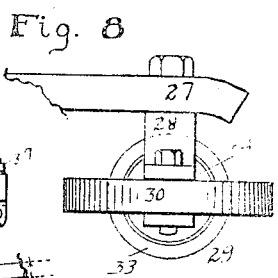
WITNESS:
H. L. Israel
E. A. Speir
INVENTOR.
George E Hasty
BY
William C Edwards Jr.
ATTORNEY.

G. E. HASTY.
CAR TRUCK, TRACK, AND STEERING MECHANISM.
APPLICATION FILED AUG. 16, 1917.
1,266,591.
Patented May 21, 1918.
2 SHEETS—SHEET 2.
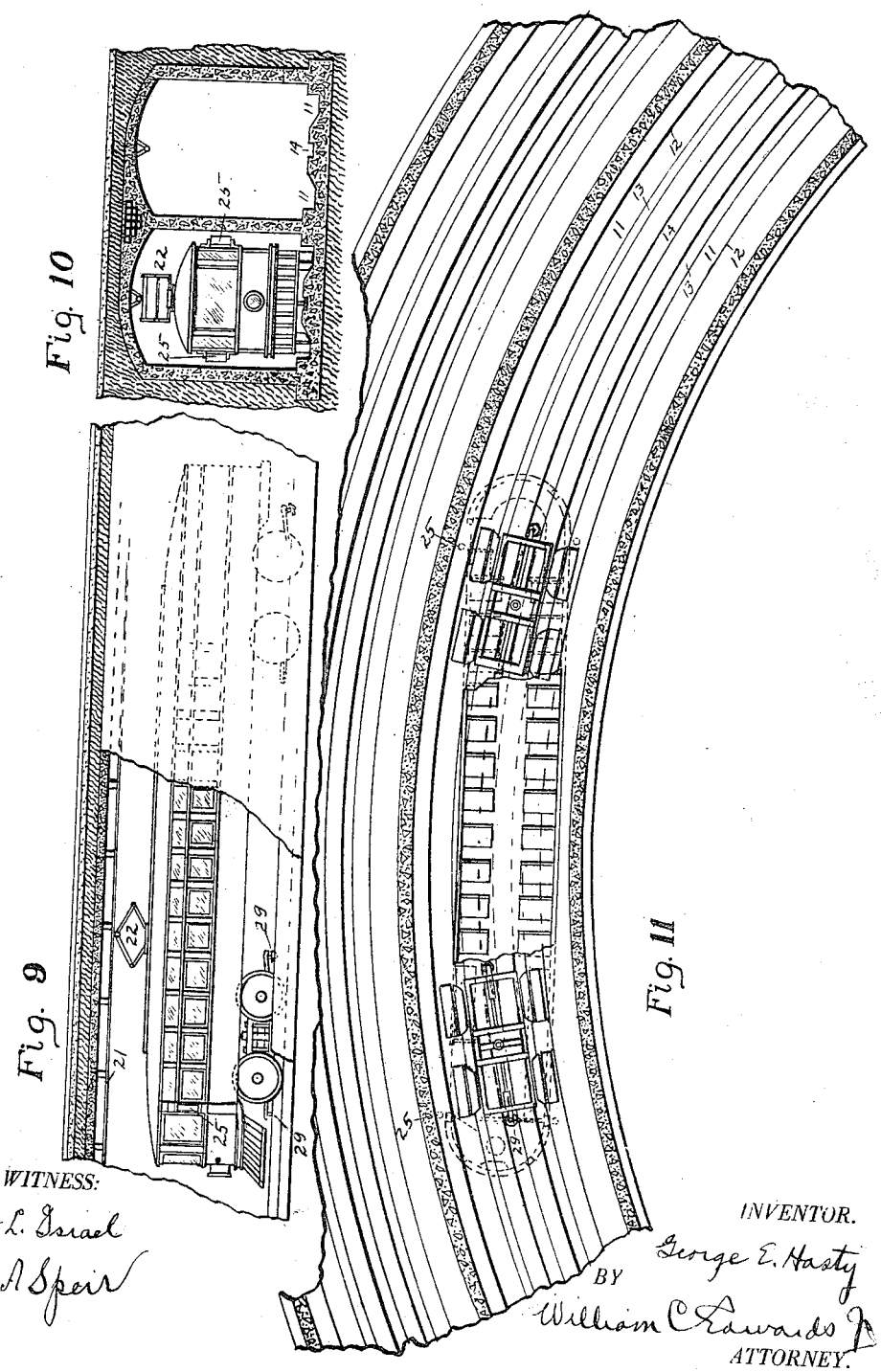

UNITED STATES PATENT OFFICE.

GEORGE E. HASTY, OF WICHITA, KANSAS.

CAR TRUCK, TRACK, AND STEERING MECHANISM.

1,266,591.

Specification of Letters Patent.

Patented May 21, 1918.

Application filed August 16, 1917. Serial No. 186,544.

*To all whom it may concern:*

Be it known that I, GEORGE E. HASTY, a citizen of the United States, residing at Wichita, in the county of Sedgwick and State of Kansas, have invented certain Improvements in Car-Trucks, Tracks, and Steering Mechanism, of which the following is a specification, referring to the accompanying drawings.

The invention has for its object the construction and operation of a street or subway car that will be comparatively noiseless and of powerful traction. In the drawings, further referred to it will be noted that the wheels of the car truck are such as to tend to produce the minimum amount of noise during travel upon a road bed suitably constructed with reference to a coacting functional relationship with said truck wheels and with allied means for guiding the same.

In the drawings Figure 1 is a side view of a car truck with one wheel removed to disclose elements of the invention. Fig. 2 is a top view of Fig. 1. Fig. 3 is a side view of the mechanism seen in Fig. 1 for steering the truck. Fig. 4 is an end view of the truck seen in Figs. 1 and 2 and showing a section through the track or roadbed. Fig. 5 is a top view of the levers and air cylinder used in connection with and for controlling the operative position of the steering mechanism disclosed in Fig. 3. Fig. 6 is a side view of Fig. 5. Fig. 7 is a top view and Fig. 8 a side view of the wheel guide, as connected to the steering arms seen in Figs. 1, 2 and 3. Fig. 9 is a side elevation of a street car as used in subway operation. Fig. 10 is a cross-sectional view through a subway showing the front end of a car as disclosed in Fig. 9. Fig. 11 is a horizontal sectional view taken through the side walls of a subway at a curve and with the roof removed to disclose the position of the trucks of my construction in rounding a curve, portions of the car proper being removed to more clearly illustrate how the steering mechanism controls the line of travel of the truck.

Similar numerals of reference indicate corresponding parts in all the figures of the drawings.

Referring to the drawings, in Figs. 1 and 2 and 4 is illustrated my improved truck and steering mechanism in combination with a road bed or track. The roadbed 10 is preferably constructed of concrete as shown in section and it will be noted that tracks or channels 11, 11 in the roadbed 10 are constructed of richer concrete for the wheel travel; the outer wall 12 of a track 11 is vertical while the inner wall 13 is inclined on a bevel to the base of the channel 11. Midway between and paralleling the two tracks 11, 11 is a central channel iron track 14 embedded in the roadbed for the purposes further defined. Truck wheels 15 mounted on axles 16 and supporting a framework 17 are seen positioned in the tracks 11, 11. These wheels 15 are of large diameter and are each composed of two sectional elements, one having a rubber tire bearing face at 18 similar to such as is commonly used in automobile truck service, the other section having a beveled tire face 19 which will be preferably covered with a fibered composition. the object being to secure noiseless traction. This beveled face 19 of a wheel is of less angle than the bevel 13 of the track 11, thus as a wheel 15 rotates on a curved track as in Fig. 11, the smallest diameter 20 of the wheel 15 will strike the incline 13 first and have a tendency to force the truck to turn as the track curves, this however is useful as an auxiliary guiding means for by special steering mechanism carried by the truck and engaging the channel 14, positive steering is obtained.

An overhead electric trolley wire 21 is contacted by the angular expanding arms 22 of the car and through proper means the electric current operates motors positioned as at 23 on the car trucks to accomplish direct drive of the wheels 15 through gearing incased at 24. Also located on each corner of the car as seen in Figs. 9, 10 and 11 will be noted vertical rollers 25, the object of which is to prevent the swing of the car from striking the side walls of the tunnel and in case of such contact, the roller 25 will revolve to prevent damage.

Hinged at 26, 26 on the frame 17 of the truck are seen steering arms 27, 27 and attached at the outer end of an arm 27 is a frame 28. Mounted in the frame 28 is seen a compound non-frictional wheel guide 29 adapted to engage the bottom or sidewalls of the channel track 14 in advance of the truck wheels 15. The arms 27 are preferably made of steel and are very strong for the purpose intended. If the guide 29 contacts the sidewalls of track 14, the rim 30 of guide 29 will revolve around the core 31, being separated therefrom by the ball race 32; or if the guide 29 contacts the bottom of the track 14 then the rim 33 will revolve around the core 34 equipped with a ball race as at 35. The spring B secured to the frame 17 operates to hold the arms 27 to proper contact with the channel track 14. The arms 27 are hinged for vertical movement only and in a plane at right angles to the car truck axles. It will thus be seen that by means of the arms 27 attached to the frame 17 and engaged with the track 14, that the truck wheels are forced to follow in proper order and relationship along their track 11 and also due to the wheel guide 29 friction and noise are further eliminated.

Referring to Fig. 9 the guides 29 at the left of each truck are engaged within the track 14 while the guides 29 at the right of each track are elevated out of the track 14, this is also illustrated in Fig. 1, this position obtains when the car is moving to the left as in Fig. 9, should the direction of travel of the car be reversed or toward the right, then the guides 29 at the left of a truck would be raised and the guides 29 at the right of the truck be lowered. This is accomplished as follows; an air cylinder is arranged as seen at 36 and adapted to engage a lever 37 pivoted at 38 to the frame 17. Flexible hose 39 is attached to the air supply pipe 40 in the end of the cylinder 36 and is properly conducted to a point convenient for operation and control by the motorman. When the air operates to shove the lever 37 forward to the dotted position seen in Fig. 5, a cam 41 attached at 42 to lever 37 is likewise moved and a roller 43 resting upon cam 41 and attached to a connecting rod 44 is thereby raised by said cam movement and a lever 45 hinged at 46 to the frame 17 and attached to said raised rod 44 is likewise raised in the direction of the arrow Fig. 3 and this movement of lever 45 operates through the connecting rod 47 to lift the steering arm 27 to the dotted position Fig. 3 or to the position seen at the right of Fig. 1, the reverse movement would lower this right hand steering arm 27 Fig. 1 and raise the left hand steering arm as the two air cylinders 36, 36 seen in Fig. 2 and elsewhere, coact properly for this purpose, the two levers 37, 37 being connected by the rod 48. A stanchion bar 49 attached to the frame 17 has a connecting bar 50 pivoted thereto which is attached to the rod 44 to properly stay the roller 43 as operated on by the cam 41.

Such modifications may be employed as lie within the scope of the appended claims.

Having fully described my invention what I now claim as new and desire to secure by Letters Patent is:

1. A road-bed for street cars comprising a concrete base having two parallel tracks channeled therein for car truck wheel travel, the outer wall of each channel track being vertical while the inner wall thereof is inclined to the base of said channel; and a car truck having paired wheels rotatable on axles, one wheel of a pair being positioned within one channel wheel track and the other wheel being positioned in the adjacent wheel channel track, each wheel comprising two sectional elements one section having a rubber tired face adapted to ride on the base of a said channel track, the other section having a beveled tire faced with a composition, said bevel being of less angular degree than the bevel of the inclined portion of the channeled track and for the purposes as specified.

2. A truck for street cars comprising a framework mounted on axles supported by car wheels, each wheel comprising two sectional elements, one element having a rubber tired periphery, the other element having a beveled tire periphery faced with a composition.

3. A truck for street cars comprising a framework mounted on axles supported by car wheels, and paired steering arms hinged to said framework, said arms being oppositely disposed to extend beyond the truck axles at the ends of said truck, and a concrete roadbed comprising parallel channel tracks adapted to receive said car wheels and an intermediate channel track adapted to receive the outer end portion of each of said steering arms; and means carried by said framework and connected to said arms and operated by compressed air, whereby said paired arms may be alternately raised and lowered in and out of said intermediate track for the purposes as specified.

4. A steering arm hinged to the framework of a street car and projecting in front thereof, said arm terminating in a compound non-frictional wheel guide comprising a frame having two rim portions at right angles to each other, each rim portion being separated from a central core portion by a ball race to permit of the revolution of such rim portion under conditions as specified.

5. A street car truck composed of a framework supported by axles and wheels, a steering arm hinged to said framework, an air cylinder and means for operating same, a lever pivotally mounted to the frame and connected to means operated by said air cylinder, a cam connected to said lever and a roller engaged therewith, said roller being connected to a rod, said rod engaging a lever, said lever connecting to said steering arm through a rod, the operation of said air cylinder occasioning movement as specified to the allied parts whereby said steering arm may be raised or lowered for the purposes set forth.

6. A road-bed for street cars comprising a concrete base having two parallel tracks channeled therein and adapted for car truck wheel travel, and an intermediate channel track paralleling said wheel tracks; the outer wall of each wheel track being vertical while the inner wall thereof is inclined to the base of the said channel; and a car truck having paired wheels rotatable on axles, one wheel of a pair being positioned within one wheel track and the other wheel being positioned in the adjacent wheel track, each wheel comprising two sections, one section having a rubber tired face adapted to ride on the base of a said channeled wheel track, the other section having a beveled face covered with a composition and adapted to contact the inclined wall of such wheel track as specified; and paired steering arms hinged to said truck framework, said arms being oppositely disposed to project at the ends of the truck, and means carried by said truck framework and operated by compressed air whereby the outer ends of said paired arms may be alternately raised and lowered in and out of said intermediate channel track for the purposes as specified.

GEORGE E. HASTY.

Witnesses:
U. G. CHARLES,
E. SAWYER.

Copies of this patent may be obtained for five cents each, by addressing the "Commissioner of Patents, Washington, D. C."